United States Patent [19]

Busdiecker

[11] 4,007,070
[45] Feb. 8, 1977

[54] METHOD OF CONSTRUCTING A HOSE

[75] Inventor: Wayne S. Busdiecker, Stow, Ohio

[73] Assignee: Parker-Hannifin Corporation, Cleveland, Ohio

[22] Filed: Oct. 17, 1974

[21] Appl. No.: 515,494

[52] U.S. Cl. .............................. 156/143; 138/123; 138/124; 138/125; 138/141; 138/145; 138/153; 156/149; 156/244; 156/305; 156/308

[51] Int. Cl.$^2$ ........................................ B32B 1/08

[58] Field of Search .......... 156/143, 144, 149, 187, 156/191, 293, 294, 331, 244, 305, 307, 308; 138/120, 123, 124, 125, 137, 141, 145, 146, 149, 153; 87/1, 6, 9

[56] References Cited

UNITED STATES PATENTS

| 3,116,760 | 1/1964 | Matthews | 138/125 |
| 3,159,183 | 12/1964 | Brumbach | 138/125 |
| 3,332,447 | 7/1967 | Holmgren | 138/125 |
| 3,489,631 | 1/1970 | Chen et al. | 156/308 |
| 3,682,201 | 8/1972 | Atwell et al. | 138/137 |
| 3,722,550 | 3/1973 | Matthews | 156/308 |
| 3,726,321 | 4/1973 | Phillips et al. | 138/125 |
| 3,861,973 | 1/1975 | Koch | 156/143 |

Primary Examiner—Caleb Weston
Attorney, Agent, or Firm—John N. Wolfram

[57] ABSTRACT

The method of constructing multi-layered hoses of plastic materials in which a coating comprising resorcinol, urethane adhesive and a solvent is applied to the outer surface of an inner tubular member or layer of either polyamide or polyester with the solvent acting as a carrier for the resorcinol and adhesive, removing a major portion of the solvent from the coating, and applying an outer tubular layer of a plastic material such as polyamide, polyester, polyurethane or polyvinyl chloride, but of a different material than the inner layer, over the inner layer in contact with the coating. The resorcinol plastisizes and wets the outer surface of the inner layer and the remaining solvent wets the inner surface of the outer layer whereby molecules of the adhesive interact with molecules of the two layers to share electrons therewith for establishing a strong bond therebetween, the amount of the remaining solvent being sufficient for wetting the outer layer but insufficient for creating gas bubbles between the inner and outer layers.

8 Claims, 6 Drawing Figures

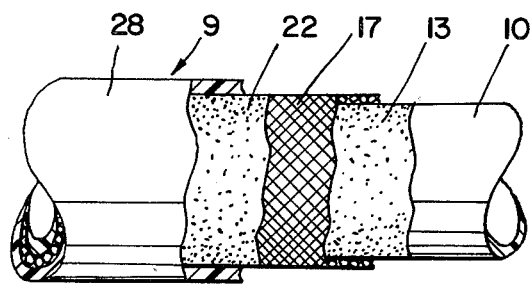
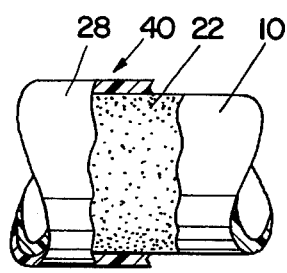
Fig. 1  Fig. 2
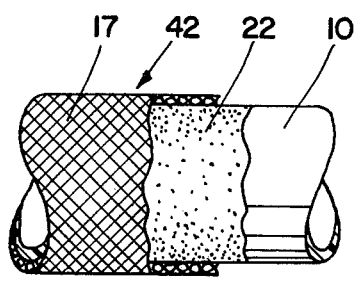
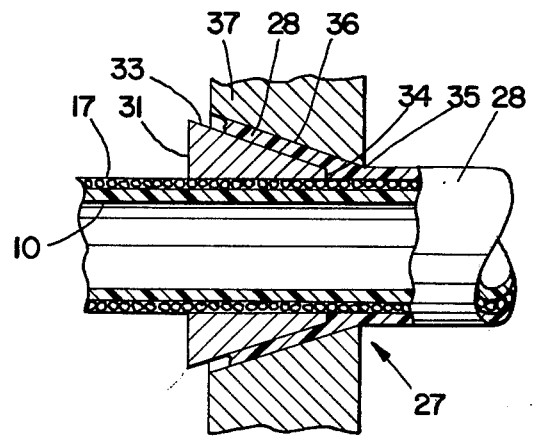
Fig. 3  Fig. 6
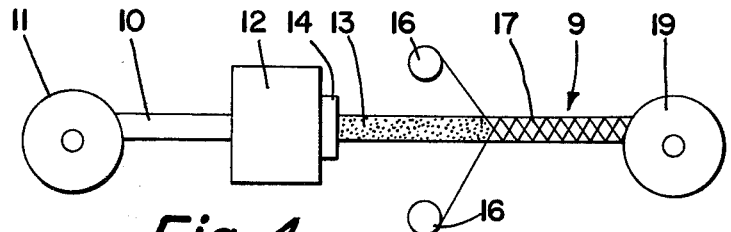
Fig. 4
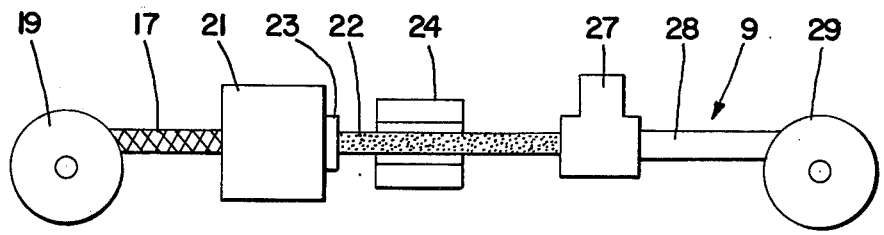
Fig. 5

METHOD OF CONSTRUCTING A HOSE

BACKGROUND OF THE INVENTION

For many applications for flexible hoses of plastic materials it is desirable that the hose be of multi-layer construction with at least some of the layers firmly bonded to each other. For example, the hose may have a core tube of a plastic material such as polyamide, polyester, polyurethane, polyvinyl chloride, or the like, with a reinforcement of plastic yarn, such as polyamide or polyester, applied thereto either by braiding, spiral wrapping or knitting. The reinforcement may or may not be covered with a sheath made from the same group of plastic materials from which the core tube may be made. When only a reinforcement is applied to the core tube, it may be desirable to bond the reinforcement to the core tube. If a sheath is also applied, it may be desirable to bond the reinforcement to either or both the core and sheath. In other hose constructions the reinforcement may be omitted and only a sheath applied and bonded to the core tube.

In hoses of the types described, many methods and adhesive materials have been used for obtaining a bond between adjacent layers. However, such methods and materials have not always been satisfactory from the standpoint of bond strength, ease of manufacture and/or safety to manufacturing personnel.

SUMMARY OF THE INVENTION

The present invention provides a method for obtaining an excellent adhesive bonding of one layer to another in a hose made of plastic materials wherein the materials for the bonding operation are commonly known and readily available, relatively safe to handle at room temperature and permit simple manufacturing operations. The invention is characterized by the use of an adhesive solution that includes resorcinol, a urethane adhesive and a solvent for the material of the outer layer of the hose of dimethylforamide or a ketone such as acetone, methylethylketone or methylisobutylketone, or a chlorinated solvent such as 1-1-1 trichlorethylene or methylene chloride. More generally, the soluble comprises a plasticizer compatible with the material of the inner member, an adhesive and a solvent in which the material of the outer member is soluble.

The method comprises coating a first tubular layer or member of plastic material with the adhesive solution, driving off a major portion of the solvent, and then applying another layer of a plastic material different from the first layer in contact with the coating. The resorcinol plasticizes, cleans and wets the outer surface of the inner layer and the remaining solvent cleans and wets the inner surface of the outer layer whereby molecules of the urethane adhesive make intimate contact with the two layers so that molecules of the urethane adhesive will interact and share electrons with molecules of the two layers for establishing a strong bond between the urethane adhesive and the two layers. The resorcinol is absorbed by the inner layer which it has plasticized and the remaining solvent that has wetted the surface of the outer layer is compatible with the material of the outer layer to the extent that it will be either absorbed thereby or passed through the outer layer without forming detrimental gas bubbles between the layers and so that none of the solvent remains in the adhesive whereby the adhesive can fully cure and develop its maximum cohesive strength.

DETAIL DESCRIPTION

FIG. 1 is a view, partly in cross section of a hose comprising a plastic core tube, a reinforcement of plastic yarn, and a sheath of plastic material.

FIG. 2 is a view like FIG. 1 but showing a hose made of a plastic core tube and a plastic sheath.

FIG. 3 is a view like FIG. 1 but showing a plastic core tube and a reinforcement layer of plastic yarn.

FIGS. 4 and 5 are schematic views of a method of making a hose in accordance with FIG. 1.

FIG. 6 is a cross section view through a nozzle for extruding a plastic sheath over a core tube having a layer of reinforcement yarn thereon.

In the example of a hose constructed in accordance with the present invention illustrated in FIG. 1, the hose 9 comprises a core tube 10 made of a flexible plastic material such as a polyamide, polyester, polyurethane or polyvinyl chloride, or the like. Over the core tube is a layer of reinforcement 17 comprising a yarn made of filaments of either polyamide or polyester material, the yarn being either braided, knitted, or spirally wound over the core tube. There is also a sheath 28 of plastic material such as polyamide, polyester, polyurethane or polyvinyl chloride but different from the reinforcement. In this instance the reinforcement is bonded to the core tube by conventional practice but the sheath is bonded to the reinforcement by a urethane adhesive applied in accordance with the present invention.

The method of constructing the hose 9 of FIG. 1 in accordance with the present invention is illustrated in FIGS. 4 and 5. A core tube 10 of the selected plastic material is first provided. The core tube 10 is passed from a reel 11 through an adhesive bath in container 12 to apply a thin coating of adhesive 13 to the outer surface of the core tube in conventional manner, there being a wiper 14 that wipes excess adhesive from the tube to form the thin coating. The adhesive may, for example, be Daubond 8412, a urethane adhesive available from Daubert Chemical Company. The coated core tube is then passed through a machine 16 that applies the tubular layer 17 of reinforcement yarn to the core tube in tensioned engagement therewith. The yarn may be either braided, knitted, or simply spirally wrapped wherein one strand is applied to the core tube with a pitch in one direction and another strand is applied over the first strand with a pitch in the opposite direction. The reinforcement covered tube is then wound on a reel 19 and stored several days to permit solvent from the adhesive bath to evaporate through the interstices of the reinforcement and for the adhesive to fully cure.

The reinforcement covered core tube is then passed from reel 19 (FIG. 5) through an adhesive liquid solution within a container 21 to form a coating 22 on the reinforcement. There is a wiper 23 that wipes excess solution from the reinforcement covered core tube as the latter exits from container 21.

The adhesive solution in container 21 may comprise a mixture of the above mentioned Daubond 8412 urethane adhesive with approximately equal parts of resorcinol and a solvent, and with the Daubond comprising 90% of the final mixture by weight. The solvent acts as a carrier for the resorcinol and the Daubond adhesive and may be from a group comprising dimethylforamide, a ketone such as acetone, methylethylketone or methylisobutylketone, or a chlorinated solvent such as 1-1-1 trichlorethylene and methylene chloride.

As the solvent and resorcinol in coating 22 contact the surface of the yarn filaments comprising reinforcement 17, they clean such surface of lubricants and other contaminates that may be thereon and also wet the surface so that the urethane adhesive may come in intimate contact therewith. Moreover, the resorcinol plasticizes such surfaces of the yarn filaments to further enable the urethane component of the coating to coact with the material of the filaments for obtaining a strong bond. It is believed that the resorcinol, which is in the form of fine solids, becomes absorbed by the yarn material and remains therein.

The partially completed hose then passes through a heater 24 and a major portion of the methylethylketone is evaporated from the coating so that only a small portion of the solvent, in the neighborhood of 20% of the original amount, remains in the coating. It is important that some of the solvent remain for wetting of the sheath material but it is also important that not enough of the solvent remains so as to cause formation of gas bubbles between the reinforcement and sheath when the hot sheath material is applied.

The partially finished hose is then passed from heater 24 through an extruder 27 that applies the outer sheath 28 into tight contact with the adhesive covered reinforcement 17 and the finished hose 9 is then wound onto a storage reel 29. As the sheath is being applied, its inner surface is wetted by the solvent remaining in coating 22 so that the urethane adhesive in the coating will intimately contact the inner surface of the sheath.

As the urethane adhesive comes into intimate contact with each of the reinforcement and sheath, the molecules of the adhesive will share electrons with the molecules of the reinforcement and sheath so that a strong bond will be achieved between the adhesive and reinforcement and between the adhesive and sheath. Because the urethane adhesive itself has strong cohesive properties the extruded sheath, in effect, will be strongly adhered to the reinforcement.

To further enhance the obtaining of a good bond between the sheath and reinforcement, the sheath is formed and applied over the reinforcement by so-called pressure tooling, as illustrated in FIG. 6. With such tooling there is an inner cone 31 that has a close fit over the adhesive coated reinforcement 17 and whose outer surface 33 tapers downwardly to form a thin forward edge 34 on the sleeve that is spaced axially inwardly of the outer edge 35 of a conical opening 36 in an extrusion nozzle 37. Conical surfaces 33, 36 are radially spaced from each other so as to form a path for extrusion of sheath material 28 therebetween. As the sheath material passes sleeve edge 34 it is forcibly pressed against the coated reinforcement 17 before it passes nozzle edge 35 to thus cause the sheath material to at least partially penetrate spaces between strands and filaments of the yarn 17 to establish a relatively large area of the inner surface of sheath 28 that is in tight contact with the thin film of adhesive that is on the yarn.

Because sheath 28 is not applied until after a major portion of the solvent has been evaporated from coating 22, and because the solvent is compatible with the sheath materials herein mentioned in that it can diffuse therethrough and/or be absorbed thereby, the portion remaining in the coating, after it has performed its wetting action on the sheath material, will either be absorbed into the material of the sheath or pass therethrough without forming gas pockets between the sheath and reinforcement which would otherwise mar the appearance of the finished hose and lower the effectiveness of the bond. Diffusion or absorption of the solvent through or by the sheath and completion of the curing of the adhesive will normally occur within two or three days after storage on reel 29.

In a specific example of a hose of the form of FIG. 1 constructed in accordance with the present invention, a core tube 10 of Nylon 6-6/6 copolymer was first processed in accordance with FIG. 4 by passing it through a bath at room temperature of Daubond 8412 urethane adhesive maintained at a viscosity of between 3000 and 15,000 CPS by addition of methylethylketone solvent with the exposure time to the bath being about 15 seconds. The core tube was wiped as it left the bath so that the adhesive formed a thin coating 13 on the core tube. The tube then passed through a braiding machine that applied a braided reinforcement DuPont type 723 Nylon yarn. The partly finished hose was then wound onto a reel 19 and stored for about 3 days to permit evaporation of the solvent through the interstices of the braid and to permit the Daubond adhesive to cure.

The partially completed hose was then put through the process illustrated in FIG. 5. The partially completed hose on reel 19 was passed through a tank 21 containing a solution comprising by weight 90% Daubond 8412, 5% resorcinol and 5% methylethylketone at room temperature. The hose passed through this bath at a rate of about 60 feet per minute so that the exposure time was about one second. Wiper 23 had a snug fit over braid 17 so that only a very thin coating 22 of about 0.001 inch thickness was on the outermost surfaces of the braid. The hose was then passed through heater 24 adjusted so that the temperature of the hose as it left the heater was about 175° F. This caused in excess of 80% of the solvent to be evaporated from the coating so that the coating was very nearly dry to the touch as it entered cross head 27 where a sheath 28 of a polyester marketed by DuPont under the designation Hytrel 5555 was applied with pressure tooling as shown in FIG. 5. The hose was then wound upon reel 29 and after about 2 days in storage the methylethylketone that had remained in the coating as the hose went through the cross head had either diffused through the sheath or had been absorbed thereby and the urethane adhesive had completed its cure.

In the hose construction 40 of FIG. 2, there is a sheath 28 of a polyester, polyurethane or polyvinyl chloride that is applied over the polyamide core tube 10 with no intermediate reinforcement material. However, there is a thin film of adhesive 22 applied in accordance with the present invention between the core tube and sheath and to which each is strongly adhered by a sharing of electrons in the respective molecules.

Hose 40 of FIG. 2 is made by coating core tube 10 with a coating of adhesive solution 22 like the coating 22 of FIG. 1. The coated portion of the core tube is then passed through a heater to evaporate a major portion of the solvent therefrom after which the coated core tube passes into an extruder for application of the outer sheath 28 thereto. In this instance the solvent and resorcinol clean and wet the outer surface of the core tube and the resorcinol plasticizes the same so that molecules of the urethane adhesive can make intimate contact with the core tube molecules and share electrons therewith for a good bond and the small remaining portion of the solvent that remains in the coating after evaporation by the heater wets and otherwise prepares the inner surface of the sheath 28 so that molecules of the latter will share electrons with molecules of the adhesive for likewise establishing a strong bond.

In the hose 42 disclosed in FIG. 3 there is a reinforcement 17 of polyester or rayon over a core tube 10 of polyamide but there is no sheath over the reinforcement. There is a coating 22 between the core tube and the reinforcement that is applied in accordance with the present invention. In this case, the hose is constructed by passing the core tube 10 into a bath of an adhesive solution such as herein disclosed in connection with coating 22 of FIG. 1 to apply a similar coating to the core tube. The coated core tube is then passed through a heater to drive off a major portion of the solvent after which the coated tube is passed through a machine for applying the layer of reinforcement 17. Because the reinforcement yarn has interstices or spaces between the filaments and between the strands of the yarn it is not necessary to drive off as much of the solvent as in the case where a solid wall sheath is applied because the remaining solvent can be evaporated from the adhesive solution either by air drying or by further application of heat. However, as in the case of the hoses of FIGS. 1 and 2, the resorcinol plasticizes and wets the outer surface of the polyamide core tube 10 and the solvent wets the inner surface of the sheath so that the urethane adhesive in the coating will make intimate contact with each whereby molecules of the adhesive will share molecules of the sheath and core materials for a highly effective bond.

I claim:

1. The method of constructing a hose comprising providing a core tube of polyamide plastic material, coating the outer surface of the core tube with a solution comprising a urethane adhesive, resorcinol and a solvent from the group comprising dimethylforamide, acetone, methylethylketone, methylisobutylketone, methylene chloride and 1-1-1 trichlorethylene, heating the coating to evaporate therefrom a major portion of said solvent so that only a minor portion thereof remains in the coating, and applying an outer tubular member of solid wall plastic material from the group comprising polyester, polyurethane and polyvinyl chloride into contact with said coating, said resorcinol plastisizing and wetting said outer surface of said core tube and said solvent remainder wetting the inner surface of said outer member whereby molecules of said adhesive will engage in intimate contact with molecules of said core tube and said outer member to share electrons therewith to form a strong bond between said adhesive and said core tube and outer tubular member.

2. The method of constructing a hose comprising providing an inner core tube of polyamide plastic material, coating the outer surface of the core tube with a solution that includes resorcinol, a solvent and a urethane adhesive, said solvent being selected from the group comprising dimethylforamide, acetone, methylethylketone, methylisobutylketone, methylene chloride and 1-1-1 trichlorethylene, permitting the resorcinol to plastisize and wet the outer surface of said core tube whereby molecules of said adhesive will intimately contact molecules of said outer surface, removing a major portion of the solvent from the coating so that only a small portion of the solvent remains in the coating, and applying a reinforcement of plastic material from the group comprising polyesters and rayon over said coating, said remaining solvent wetting the inner surface of said reinforcement to permit said adhesive to come into intimate contact therewith whereby molecules of the adhesive will share electrons with molecules of said core tube and said reinforcement so as to form a strong bond between said adhesive and said core tube and said reinforcement.

3. The method of constructing a hose comprising providing a core tube of a plastic material selected from the group comprising polyamides, polyesters, polyvinyl chloride, and polyurethanes, applying a coating of adhesive to the outer surface of the core tube, applying over the core tube a reinforcement comprising strands of a plastic material selected from the group comprising polyamides and polyesters, coating the outer surface of said reinforcement with a solution comprising a urethane adhesive, resorcinol and a solvent from the group comprising dimethylforamide, acetone, methylethylketone, methylene chloride, and 1-1-1 trichlorethylene, removing a major portion of said solvent so that a minor portion thereof remains in the coating, and applying an outer tubular member of plastic material from the group comprising polyamides, polyesters, polyurethanes and polyvinylchlorides but different than the material of said reinforcement into tight contact with said coating, said resorcinol plastisizing and wetting said reinforcement and said solvent remainder wetting the inner surface of said outer member whereby molecules of said urethane adhesive will engage in intimate contact with molecules of said reinforcement and said outer member and share electrons therewith so as to form a strong bond between said urethane adhesive and said reinforcement and said outer member.

4. The method of constructing a hose of plastic materials comprising providing an inner tubular member of a plastic material selected from the group comprising polyamides and polyesters, coating the outer surface of the inner member with a solution comprising a urethane adhesive, resorcinol and a solvent from the group comprising acetone, methylethylketone, dimethylforamide, methylisobutylketone, methylene chloride and 1-1-1 trichlorethylene, removing a major portion of said solvent so that a minor portion thereof remains in the coating, and applying an outer tubular member of plastic material selected from the group comprising polyamides, polyesters, polyurethanes and polyvinylchlorides but different from the material of the inner member into tight contact with said coating, said resorcinol plasticizing and wetting said outer surface of the inner member and said solvent remainder wetting and solvating the inner surface of said outer member whereby molecules of said adhesive will engage in intimate contact with molecules of said members and share electrons therewith to form a strong bond between said adhesive and said members.

5. The method of claim 4 in which said inner member is a tube of solid wall and said outer member is a reinforcement formed of strands comprising filaments.

6. The method of claim 4 in which said inner member and said outer member are tubes of solid wall.

7. The method of claim 4 in which there is a core tube of solid wall within said inner tubular member and bonded thereto by an adhesive, said inner tubular member is a reinforcement formed of strands comprised of filaments and said outer member is a tube of solid wall.

8. The method of claim 7 in which said inner member includes interstices between said strands and said outer member applies radially inward pressure onto said inner member and penetrates said interstices.

* * * * *